United States Patent [19]

Lavery et al.

[11] Patent Number: 4,579,299

[45] Date of Patent: Apr. 1, 1986

[54] QUICK TURN, 90 DEGREE OMNIAXIAL NOZZLE THRUST CONTROL SYSTEM

[75] Inventors: Joseph R. Lavery; Wendell O. Johnson, both of Brigham City, Utah

[73] Assignee: Morton Thiokol, Inc., Chicago, Ill.

[21] Appl. No.: 371,035

[22] Filed: Apr. 22, 1982

[51] Int. Cl.$^4$ .............................. F41G 7/00; F02K 1/40
[52] U.S. Cl. .................................. 244/3.22; 239/265.35
[58] Field of Search .................. 60/232, 233, 271, 228; 239/265.33, 265.35, 265.19; 244/3.22, 52; 285/272, 168, 184, 164, 150

[56] References Cited

U.S. PATENT DOCUMENTS

| | | | |
|---|---|---|---|
| 1,961,148 | 6/1934 | Corley | 285/168 |
| 3,400,540 | 9/1968 | Cresswell et al. | 239/265.35 |
| 3,416,754 | 12/1968 | Pinaire et al. | 239/265.35 |
| 3,485,450 | 12/1969 | Kurti et al. | 239/265.35 |
| 3,687,374 | 8/1972 | Nash | 239/265.35 |
| 3,727,843 | 4/1973 | Parilla | 239/265.35 |
| 3,908,908 | 9/1975 | Johnson | 239/265.35 |
| 3,945,573 | 3/1976 | Burgess et al. | 239/265.35 |
| 4,157,788 | 6/1979 | Canfield et al. | 239/265.35 |

*Primary Examiner*—Charles T. Jordan
*Attorney, Agent, or Firm*—Gerald K. White

[57] ABSTRACT

The thrust control system has two rotatable joints, a blast tube joint connected to the rocket motor blast tube with 360 degrees continuous-rotation about the motor axis in either direction, and a nozzle joint joined to the blast tube joint with a 90 degree movement in either direction to the motor. Each joint is actuated by an independent servoactuator that gives independent and concurrent turning. The thrust vector of the system in any direction is substantially equal to the total motor thrust. The resultant side force of the nozzle when vectored in any position passes through the motor axis whereby induced roll moment is not developed.

11 Claims, 13 Drawing Figures

QUICK TURN, 90 DEGREE OMNIAXIAL NOZZLE THRUST CONTROL SYSTEM

BACKGROUND OF THE INVENTION

1. Field of the Invention

The present invention relates to an omniaxial thrust vector control system having high side force capability for controlling the flight of solid propellant rocket motor propelled tactical missiles, and in particular, for rapidly changing the flight path of such missiles to intercept highly maneuverable targets in a large envelope.

2. Description of the Prior Art

For tactical missiles such as the Agile type, the most efficient means of performing the required mission is to use a boost-sustain solid propellant rocket motor. The boost phase rapidly accelerates the missile to a high velocity, and the sustain phase maintains or slightly increases this velocity. The longer the sustain phase lasts, the greater the range of the missile. For a given amount of propellant, increasing the sustain duration necessitates lowering of the sustain thrust level. The limit is reached when the thrust level multiplied by the sine of the thrust vector angle reaches the minimum side force required to maintain control. Increasing the thrust vector angle permits a lower sustain thrust level, a longer sustain duration, and increased range. Efficiency drops sharply, however, as large angles are approached, due to the rocket motor nozzle forcing the motor working fluid or gases to undergo a change in direction at or near the throat area where the gases have already attained extremely high velocities within the sonic range.

An omniaxial duct forming assembly for deflecting rocket motor gases and thereby effecting thrust vector control is disclosed in U.S. Pat. No. 3,727,843, granted April 17, 1973 to Arthur R. Parilla for "DUCT-FORMING ASSEMBLIES AND VECTOR CONTROL". That patented duct-forming assembly includes an outer annular member and an inner solid member defining a converging annular duct therebetween having an annular throat section of reduced cross-sectional area. The members are rigidly interconnected for rotation as a unit within a housing. The assembly is characterized in that the annular duct remains fixed in geometry as the members are deflected in the housing, and any change of direction of a fluid passing through the duct is caused to occur in advance of the throat in a region where the area is less restricted and the flow is at a velocity in the subsonic range.

A disadvantage of such prior art duct-forming assembly, particularly for use with tactical missiles using boost-sustain motors, is the limited angular deflection that is permissible, the maximum angle of deflection being of the order of twenty degrees (20°) or less. As a result, the side thrust is substantially less than the undisturbed axial thrust. Another disadvantage resides in the requirement for a special and rather complex duct-forming assembly.

In U.S. Pat. No. 3,485,450, granted on Dec. 32, 1969 to Alexander Kurti et al for "PLANETARY GEAR SYSTEM DRIVE MECHANISM", a swiveable exhaust deflection apparatus is disclosed for deflecting a gas stream of a gas turbine engine for powering vertical take-off and landing aircraft, a planetary gear system being provided for uniplanar rotation of a plurality of nozzle segments from a single power drive. U.S. Pat. No. 3,687,374 discloses a similar swiveable jet nozzle, also swiveable in a single plane, that is proposed for aircraft used to provide a vertical take-off and landing capability. While these prior patents describe nozzle structures having relatively rotatable segments, neither discloses a structure having omniaxial capability.

SUMMARY OF THE INVENTION

An object of the invention is to provide an improved omniaxial thrust vector control system for controlling the flight of solid propellant rocket motor propelled tactical missiles.

Another object of the invention is to provide such a thrust vector control system having a large vector angle capability permitting an increase in missile range over smaller angle systems of the same size.

An additional object of the invention is to provide such a thrust vector control system that is of flight weight configuration, and permits thrust vectors of from 0° to ±90° off the longitudinal axis of the missile.

A further object of the invention is to provide such a thrust vector control system in which the side thrust may be substantially equal to 100% of the undisturbed axial thrust.

Still another object of the invention is to provide such a thrust vector control system wherein system total pressure losses are minimal, the changing in direction of the rocket motor working fluid or gases being accomplished in the subsonic flow field.

In accomplishing these and other objectives of the invention there is attached to the tactical missile rocket motor, aft of the blast tube thereof, a high side force thrust vector control system that utilizes two joints. One is a blast tube joint that is rotatable around the missile axis in either direction. The other is a nozzle joint that is rotatable 90° in either direction from the missile axis. Thus, the two joints are rotatable in planes that are normal to each other. The rotation is such that omniaxial deflection of the nozzle joint is achieved. The blast tube joint controls the orientation and the nozzle joint controls the thrust vector angle. Together, the two joints provide complete omniaxial thrust vector control to ±90°.

The blast tube joint is located upstream of the nozzle joint at the aft end of the rocket motor blast tube. The rotation plane of this joint is normal to the center line or longitudinal axis of the missile. The blast tube joint includes a blast tube joint joining member, specifically a flow splitter housing, having a modified Y shape, the stem of which housing joins and revolves around the longitudinal axis of the motor blast tube. Immediately aft of the blast tube joint, the stem branches into two arc-shaped inlet ducts through which the motor gases are channeled and fed at the remote ends thereof radially inward to the nozzle inlet. The gases are then turned parallel to the nozzle axis and exhausted through the exit cone. The nozzle joint allows the nozzle to rotate with respect to the ducts to provide thrust deflection in the plane of the missile axis. The nozzle joint includes a nozzle joint joining members, specifically a cylindrical tube of the side of which a nozzle is attached, which tube connects and rotates about the duct ends of the blast tube joint. Any combination of rotation of each of the two joints results in thrust vector control, thrust vector control of up to ±90° being obtainable.

The radial structure of the ducts of the blast tube joint rapidly transfers the gases with very little stagnation losses, and creates an omniaxial thrust that is almost equivalent to the total motor thrust. Each joint rotates about an individually associated fixed axis and may incorporate ball or roller bearings to reduce actuation torque requirements.

The actuation system for providing the rotation of the two joints includes two actuators comprising hydraulic motors and appropriate gearing which provide independent actuation of each joint. One actuator controls the radial orientation of the thrust vector by rotating the upstream or blast tube joint. The second actuator rotates the nozzle with respect to the ends of the ducts to control the magnitude of the thrust vector angle.

BRIEF DESCRIPTION OF THE DRAWINGS

Having summarized the invention, a detailed description follows with reference being had to the accompanying drawings which form part of the specification, of which.

DESCRIPTION OF THE PREFERRED EMBODIMENT

Figure 1:
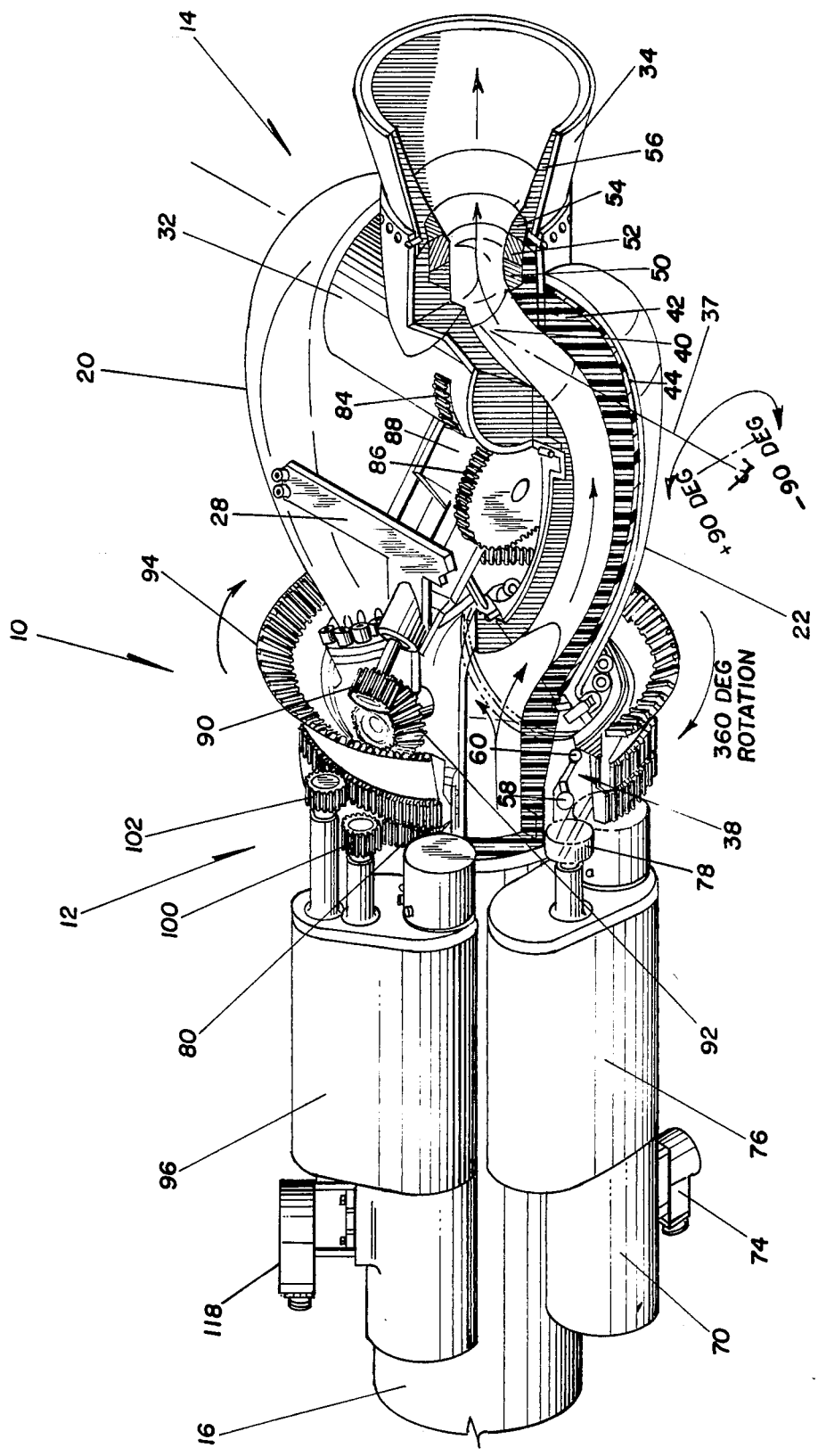
FIG. 1 is a pictorial representation with parts broken away of the rocket motor high side force thrust vector control system according to the present invention.
Figure 2:
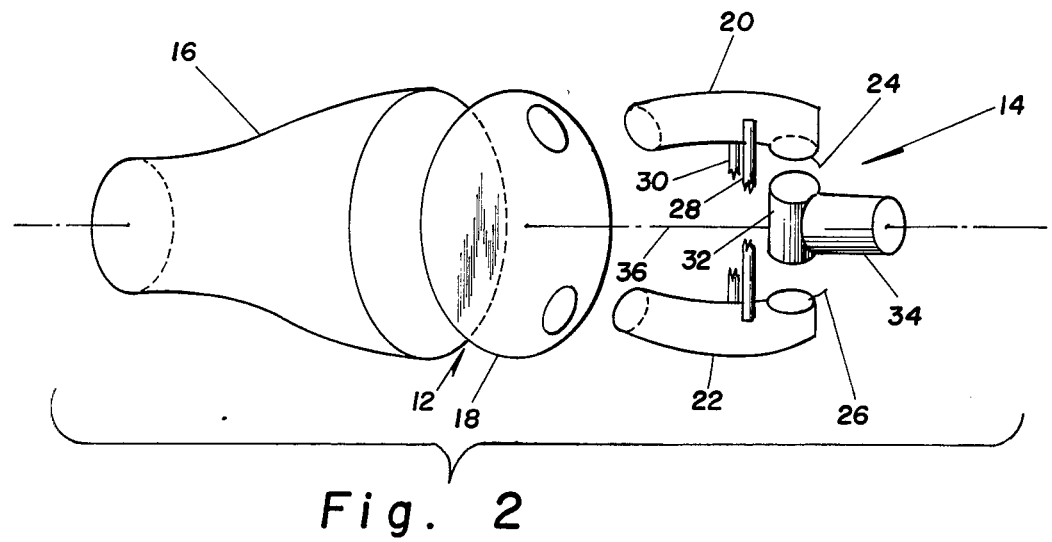
FIG. 2 is an exploded schematic view of the blast tube joint and the nozzle joint of the system of FIG. 1.
Figure 3:
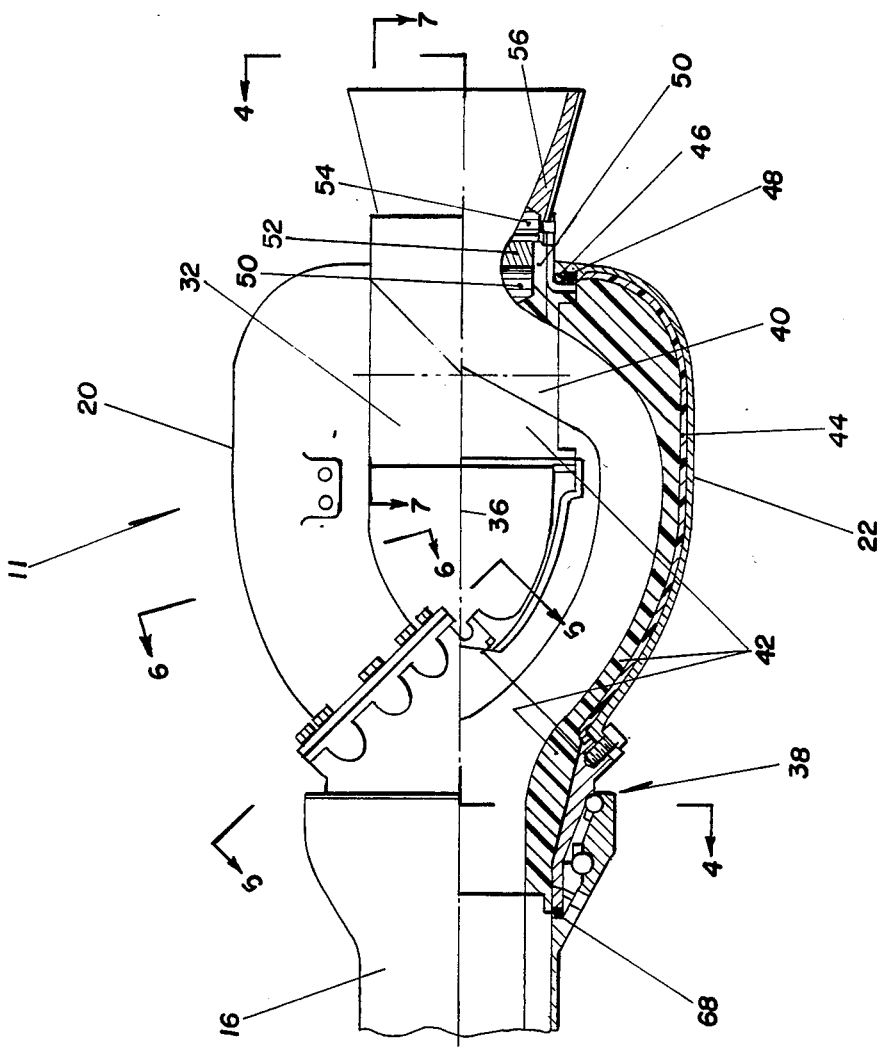
FIG. 3 is a side elevational view, partly in cross section illustrating the structure of the nozzle joint and of the arced-shaped ducts of the blast tube.

The high side force thrust vector control system according to the invention, designated by the reference numeral 10 in FIG. 1, comprises a nozzle assembly 11 that utilizes two joints indicates generally at 12 and 14. The joint 12, as best seen in FIGS. 1, 2 and 3, is between the aft end of the blast tube 16 of a tactical missile rocket motor (not shown) and a flow splitter housing 18. Mounted on the housing 18 as by suitable flange and bolt attachment means, or by welding, if desired, are two oppositely disposed identical arc shaped inlet ducts 20 and 22. The curvature of the arcs of each of the ducts 20 and 22 is such that the open end 24 of duct 20 faces the open end 26 of duct 22. An upper strap 28 and a lower retaining strap 30 may be provided, as shown, for maintaining the desired spacing between the ducts 20 and 22.

Figure 4:
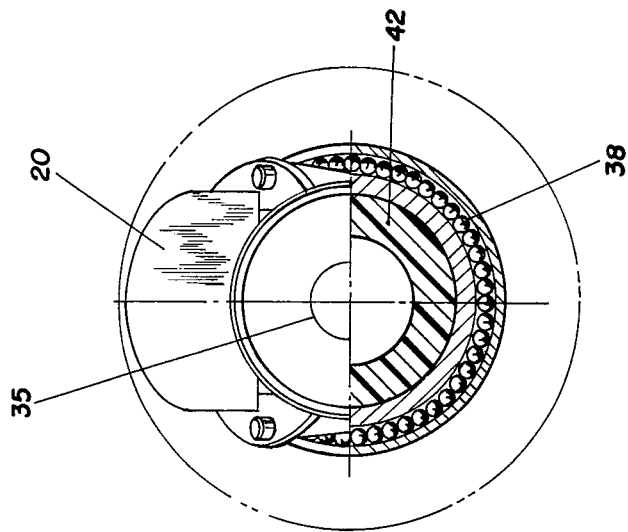
FIG. 4 is a view partly in cross section of the structure of FIG. 3 taken along the lines 4—4.

Positioned between the duct open ends 24 and 26 is a tube 32 from the side of which a rocket motor nozzle 34 extends, being rigidly attached thereto in any suitable manner. The nozzle 34 may be of the converging-diverging type having a throat 35, as shown in FIG. 4. The tube 32 connects and is rotatable about the ends 24 and 26 of the ducts 20 and 22, forming the abovementioned joint 14.

For convenience of reference the joint 12 between the housing 18 and the rocket motor blast tube 16 will be referred to hereinafter as the blast tube joint 12, and the joint 14 between the tube 32 and the open ends 24 and 26 of the ducts 20 and 22 will be referred to as the nozzle joint 14.

As is apparent from the drawings, the blast tube joint 12 and the nozzle joint 14 are rotatable in planes that are normal to each other. The rotation plane of the blast tube joint 12 is normal to the axis 36 of the blast tube 16, the hence, of the associated rocket motor and missile. Rotation of the blast tube joint 12 through 360° around the center line or axis 36 in either direction is permitted, as indicated in FIG. 4. The nozzle joint 14 may be turned 90° in either direction to the center line 36. The rotation of the nozzle 34 is on an axis 37 that is perpendicular to the missile center line 36, as shown in FIG. 1. Accordingly, the blast tube joint 12 controls the orientation and the nozzle joint 14 controls the magnitude of the thrust vector angle. Together, the two joints 12 and 14 provide complete omniaxial thrust vector control up to ±90°.

The rocket motor gases flow from the blast tube 16 into the flow splitter housing 18 and through the arced ducts 20 and 22 into the nozzle joint tube 32 towards the center line 36 of the missile and out of the nozzle 34 to provide a thrust force directed against the center line 36. The system is characterized in that the resultant side force of the thrust, with the nozzle 34 in any of its deflected positions, is in the plane of the missile center line 36 thereby avoiding the development of induced roll movement.

The ducts 20 and 22 serve to channel the flow outward from the blast tube 16 and back toward the center line or axis 36 of the missile through a single axis bearing system 38, as shown in FIGS. 1, 4, 11 and 13. This bearing system 38 allows a full 360 degree single plane rotation at the blast tube joint 12, that single plane, as noted, being normal to the axis 36.

Figure 5:
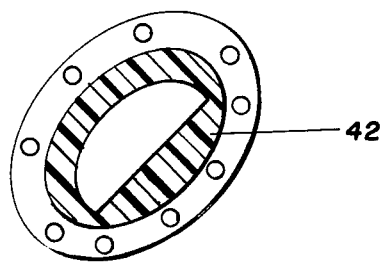
FIG. 5 is a cross section of the structure of FIG. 3 taken along the lines 5—5.
Figure 6:
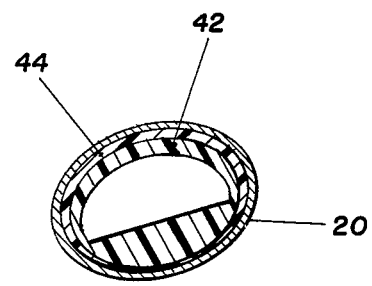
FIG. 6 is a cross section of the structure of FIG. 3 taken along the lines 6—6.
Figure 7:
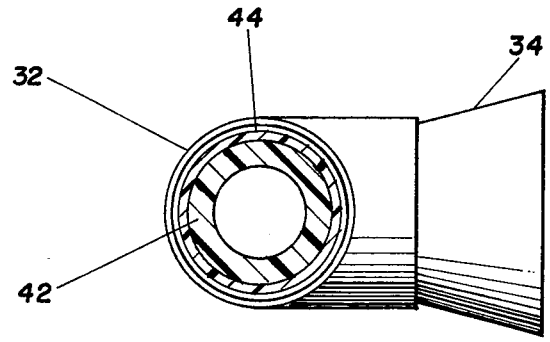
FIG. 7 is a cross section of the structure of FIG. 3 taken along the lines 7—7.
Figures 8, 9:
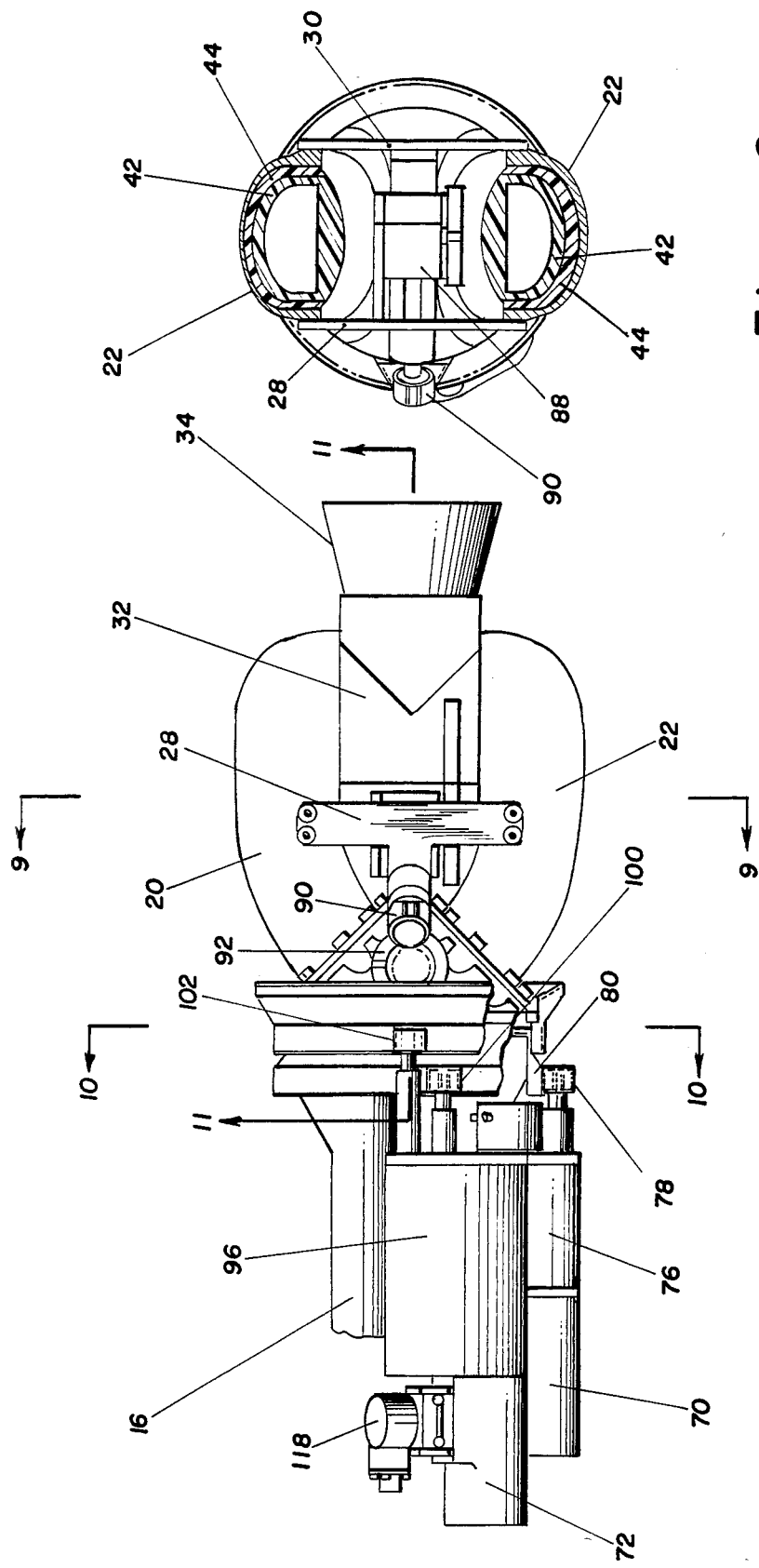
FIG. 8 is a side elevational view of the thrust vector control system of FIG. 1.
FIG. 9 is a cross section of the arrangement of FIG. 8 taken along the lines 9—9.

The ducts 20 and 22 may be so configured as to provide the best compromise between a maximum flow area and an optimum pressure vessel shape without violating system envelope requirements. The cross section shape selected for use in the preferred embodiment of the invention, as illustrated in FIGS. 5, 6 and 9, is a segment of a circle having a combined flow area of approximately 4.8 square inches and an area ratio of 3:1. As the motor gases are turned into the inlet 40 of nozzle 34, the area ratio is reduced to approximately 2:1.

Fabrication of the flow splitter housing 18 may be by casting or other techniques, as desired. In the preferred embodiment, a casting of 17-4PH stainless steel, age hardened to the H1025 condition is employed.

An elastomer modified carbon fiber molding compound shown at 42 in FIGS. 3 and 6 may be used to insulate the ducts 20 and 22 and the flow splitter housing 18. This material has good erosion resistance, is easy to mold, and has relatively good insulating capabilities. For providing additional thermal protection to the duct walls, a 0.100 inch (0.254 cm.) thick silicone rubber layer 44 may be located between the carbon fiber molded liners and the steel shell. The carbon fiber liner 42 may be molded external to the ducts and then bonded in place with the silicone rubber 44.

The rotatable nozzle 34 is capable of greater than ±90 degress of motion. The housing ends of the inlet to the nozzle are mounted on two cylindrical roller bearings which permit rotation of the tube 32, and hence, also of the nozzle 34, with respect to the opposed ends 24 and 26 of the ducts 20 and 22, respectively. A row of roller bearings is located at each nozzle inlet-ducting interface, one such roller bearing row being indicated at 46 in FIG. 3. The inner and outer races of the nozzle roller bearings 46 may be made of 17-4PH electroless steel, nickel-plated to a hardness of RC58 minimum.

Gas pressure is sealed, as indicated at 48 in FIG. 3, with pressure actuated "omniseals" made of tetrafluoroethylene and internally loaded with helically wound seals. Omniseals 48 are desirable for this use because they permit the greater clearances that are required by the bearing deflections.

Nozzle 34 may be made of 17-4PH stainless steel castings, age hardened to the H1025 condition. An elastomer modified phenolic carbon fiber molding compound, as indicated by the reference numeral 42, may be used to insulate the inlet 40 of the nozzle 34. This material, as noted, molds very easily and also has good erosion resistance and adequate insulation capabilities. The nozzle entrance is made of taped wrapped carbon cloth 50, which also supports graphite rings 52 in the nozzle throat section. Aft of the throat is an edge grain graphite cloth ring 54 and a tape wrapped carbon cloth exit cone 56.

The high side thrust vector nozzle system 10 utilizes two separate bearing assemblies to achieve omniaxial thrust deflection. Both assemblies integrate the inner and outer races with the adjacent structures, thereby providing maximum rigidity with minimum weight in addition to minimizing tolerance stackup. Rigidity is important to insure low, reproducible actuation torques. Ball or roller separators may be used throughout to minimize friction torques.

Figure 13:
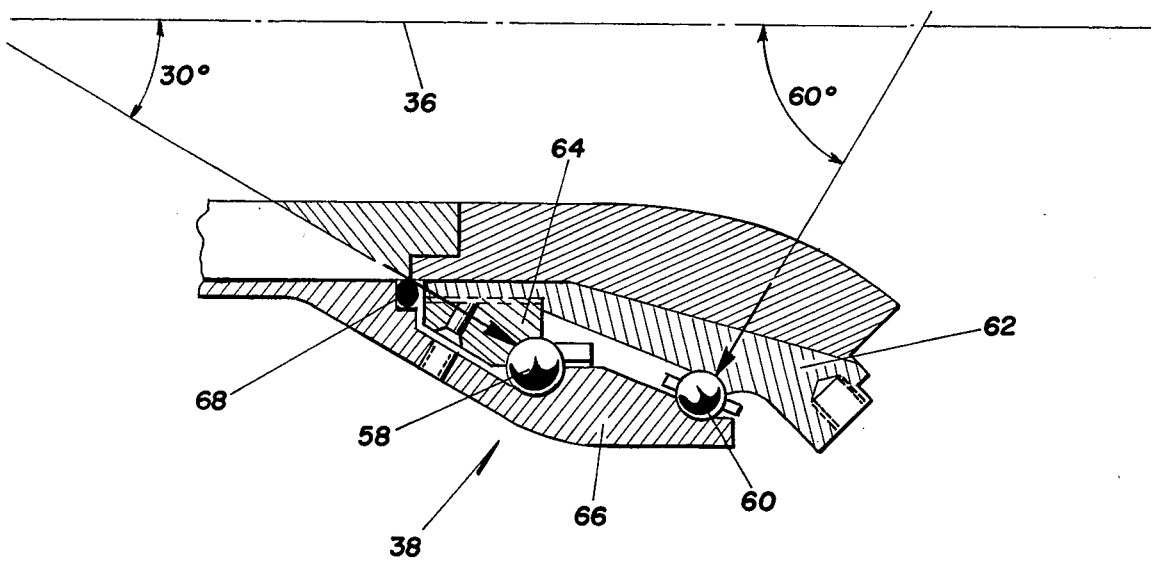
FIG. 13 is a fragmented cross sectional view showing the blast tube joint bearing system.

The blast tube bearing system operates under heavy thrust loading, with oscillating radial and moment loads. This bearing system, referred to hereinbefore and indicated at 38 in FIGS. 1, 4 and 13, comprises a solid preloaded configuration including a forward row 58 and an aft row 60 of balls. The configuration may be described as a back-to-back, double angular contact bearing. The thrust (ejection) load is carried by the larger forward row of balls 58 at a contact angle of 60 degrees (30 degrees from the thrust axis 36), as illustrated in FIG. 13. The radial and moment load resulting from nozzle deflection is carried by both rows of ball bearings.

The blast tube bearing system 38, as shown in FIG. 13 includes an aft inner race-radial, designated by the numeral 62, a forward inner race-thrust designated 64, and an outer race-thrust and radial, designated 66. The aft inner race 62 may be made of 17-4PH electroless, nickel plated to a hardness of Rc58. The inner race 64 and the outer race 66 may be made of SAE 52100 steel. In the preferred embodiment, the forward row 58 comprises 30 balls each having a diameter of 0.375 (0.9525 cm.) inches. The aft tow 60 comprises 42 balls each having a diameter of 0.312 (0.7925 cm.) inches. The balls of both rows 58 and 60 may be made of SAE 52100 steel. Gas pressure may be sealed with "omniseals", as indicated at 68 in FIG. 13.

The actuation system for the high vector angle nozzle 34 is shown in FIGS. 8, 9, 10 and 11. Hydraulic motors, as indicated at 70 and 72 in FIG. 8, and appropriate gearing are utilized to provide independent actuation of the rotatable blast tube joint 12 and the nozzle joint 14. Each rotatable joint 12 and 14 has an independent actuator. The two actuators control the orientation and the magnitude of the thrust vector angle, respectively. A differential gearing arrangement allows both actuators to be fixed to the aft portion of the motor blast tube 16 with no hydraulic or electrical lines crossing the rotatable blast tube joint 12. Desirably, a servovalve rated at 2.5 GPM at 100 psi, drop may be provided, as shown at 74 in FIG. 10, for controlling the orientation of hydraulic motor 70.

Hydraulic motor 70 is mounted to an orientation actuator assembly 76 which includes a 4.6:1 gear reducer. The output gear 78 of the actuator assembly 76, as seen in FIGS. 1 and 8, drives the entire nozzle assembly aft of the blast tube joint 12 through an integral ring gear 80, with an additional gear reduction of 9:1. This results in a total gear reduction from the motor 70 to the rotatable blast tube joint 12 of 41.4:1. The motor 70 preferably is so selected as to produce about 37 in.-lb. of torque at 3000 psi, resulting in a 1,532 in.-lb. torque at the joint.

The orientation actuator assembly 76 also provides a mount and appropriate gear reduction for an orientation feedback device 82 for providing an electrical signal that is indicative of the exact angular position of the blast tube joint 12. This enables the housing 18 of the blast tube joint 12 to be driven to a commanded orientation by the shortest route. The orientation feedback signal must also be used to control the polarity of the nozzle deflection angle command which must be opposite for orientations that are 180° apart. The feedback device 82 per se forms no part of the present invention, and therefore, will not be further described herein except to note that several forms of such devices are known in the art including the Digital Shaft Position Encoder and the Dual Element Sine/Cosine Potentiometer.

Figure 11:
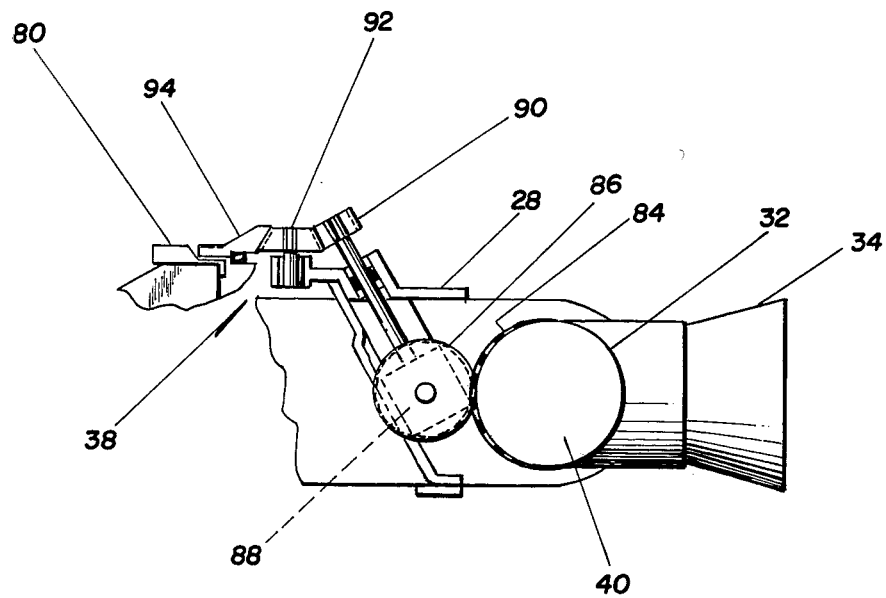
FIG. 11 is a cross section of the arrangement of FIG. 8 taken along the lines 11—11.

The nozzle deflection actuation system is somewhat more complex mechanically than the orientation actuating system. Starting from the output of the nozzle deflection system, as seen in FIGS. 1 and 11, it will be noted that the rotating nozzle cylindrical tube 32 includes an integral nozzle sector gear 84 that extends slightly more than 180° around the tube 32. Nozzle sector gear 84 is driven by a mating gear 86 that comprises the output gear of a right-angle box 88 having a drive gear indicated at 90. The right-angle box drive gear 90 is driven through an idler gear 92 by a large floating ring gear 94 that is concentric to the rotating blast tube joint 12.

Figure 10:
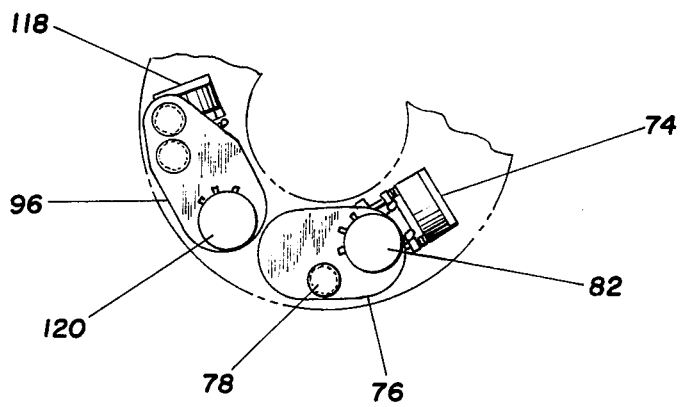
FIG. 10 is a cross section of the arrangement of FIG. 8 taken along the lines 10—10.

In accordance with the invention, deflection of the nozzle 34 is proportional to the relative rotational displacement of the floating ring 94 and the ring gear 80 that is integral with the housing 18 aft of the blast tube joint 16. This relative rotation is provided through an equal-bevel differential that is mounted in fixed position in a deflection actuator assembly 96, as seen in FIGS. 1, 8 and 10, forward of the blast tube joint 12.

Figure 12:
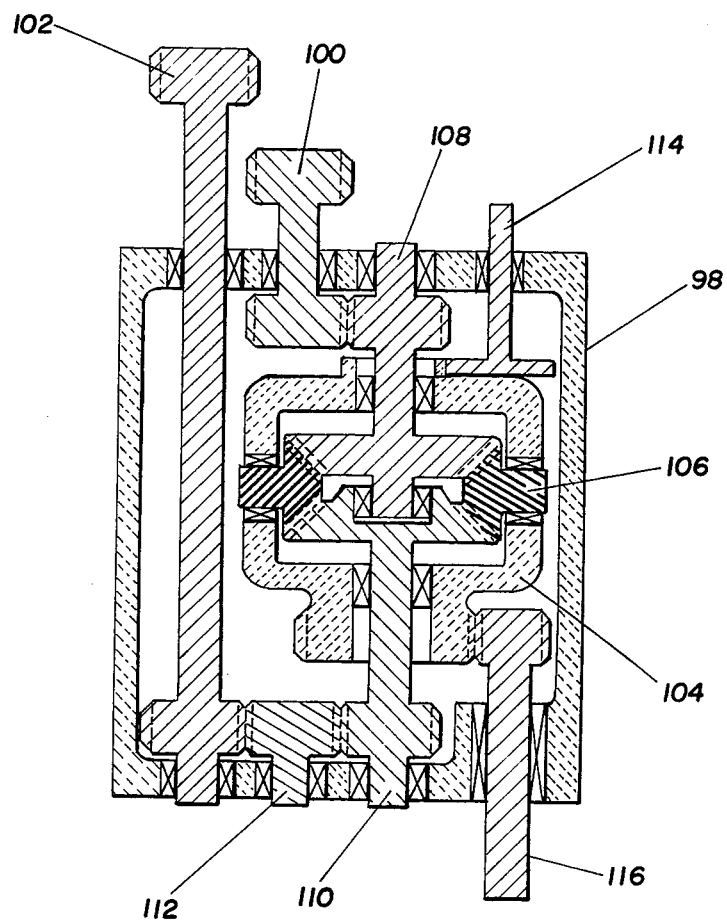
FIG. 12 is a cross sectional view of the deflection actuator gear box shown in FIG. 11.

As shown in FIG. 12, the deflection actuator assembly 96 includes a gear box 98 from which extend differential output pinion gears 100 and 102. Output gears 100 and 102 may be identical. The deflection actuator gear box contains therein a planet cage 104, a planet gear 106, an equal-bevel gear 108, an equal-bevel gear 110, an idler gear 112, and a bevel gear 114. A drive shaft 116 extends from the gear box 98 for connection to the hydraulic motor 72.

The two identical output pinions 100 and 102, as shown in FIG. 1, mesh with the integral ring gear 80 and the floating ring gear 94, respectively. The pinions 100 and 102 are coupled to the two equal-bevel gears 108 and 110, respectively, the pinion 102 through the idler gear 112 to reverse the direction of rotation. When the planet cage 104 is fixed, both pinions 100 and 102 are forced to rotate at the same speed. As a result, when the blast tube joint is rotated by the orientation actuator assembly 76, the floating ring gear 94 must follow whereby no deflection of the nozzle joint 14 and of nozzle 34 can occur. Conversely, when the planet cage 104 is rotated by the hydraulic motor 72 by way of drive shaft 116, the floating ring gear 94 is rotated with respect to the integral ring gear 80 in exact proportion to the rotation of the planet cage 104, resulting in correspondingly proportional rotation of nozzle joint 14 and nozzle deflection. This relative rotation is independent of any concurrent rotation of the blast tube joint 12 caused by operation of the orientation actuator assembly 76.

Hydraulic motor 72 for the deflection actuator assembly 96 may be of the same type as the hydraulic motor 70 for the orientation actuator assembly 76. Because of the lower inertia of the deflection actuator assembly, however, the total gear reduction is only 25:1. Therefore, the motor velocity is lower, and the hydraulic servovalve indicated at 118 in FIG. 10, is smaller, being rated at 1.45 GPM at 1000 psi drop. The stall torque of the nozzle joint 14 is 925 in.-lb.

Since the nozzle deflection actuator is not a continuous rotation device, the position feedback signal can be provided by a standard rotary potentiometer as indicated at 120 in FIG. 10. The potentiometer may be mounted to the differential gear housing 98 and geared to the planet cage 104 by the bevel gear 114.

Thus, there has been provided, according to the invention, a high side force thrust vector control system for solid propellant rocket motor propelled tactical missiles that utilizes two joints, a blast tube joint 12 and a nozzle joint 14, rotating in planes normal to each other such that omniaxial thrust deflection is effected, with thrust vectors of from 0° to ±90° being permitted, and in accordance with which the side thrust may be substantially equal to the undisturbed axial thrust. The resultant side force of the nozzle when vectored to any position passes through the motor longitudinal axis or center-line whereby induced roll moment is not developed.

The actuation system for the thrust vector control system utilizes two hydraulic actuators and appropriate gearing to provide independent actuation of the rotating blast tube joint 12 and the nozzle joint 14. The two actuators control the orientation and the magnitude of the thrust vector angle, respectively. A differential gearing arrangement is provided that allows both actuators to be fixed to the blast tube of the rocket motor with no hydraulic or electrical lines crossing the rotating joint.

We claim:

1. A thrust vector control system for a rocket motor propelled missile comprising,
    a rocket motor having a blast tube at the aft end thereof that is concentric with the missile center line and having a nozzle assembly aft of said blast tube,
    said nozzle assembly including a combination of two joints consisting of
    a blast tube joint including a blast tube joint joining member that is connected to the aft end of the motor blast tube and is operative for continuous rotation in either direction with respect thereto in a plane normal to the missile center line for effecting adjustment in the radial orientation of the thrust vector, and
    a nozzle joint connected to the blast tube joint aft thereof and having a nozzle joint joining member that is operative for movement in the plane of the missile center line through a substantial angle in either direction from the missile center line for effecting adjustment in the magnitude of the thrust vector angle,
    said blast tube joint and nozzle joint joining members being adjustable independently of and concurrently with each other whereby any combination of adjustment of said blast tube joint and nozzle joint joining members results in omniaxial thrust vector control of the missile.

2. A thrust vector control system as specified in claim 1 further including actuating means for rotating said blast tube joint joining member and moving said nozzle joint joining member for effecting adjustment in the radial orientation and magnitude of the thrust vector angle.

3. A thrust vector control system as specified in claim 1 wherein said nozzle joint joining members is connected to the blast tube joint joining members for 90 degree movement in either direction from the missile center line.

4. A thrust vector control system as specified in claim 3 wherein said nozzle joint joining members includes a nozzle of the converging and diverging type with the center line of the nozzle, when in null position, being in alignment with the missile center line.

5. A thrust vector control system as specified in claim 4 wherein said blast tube joint joining member comprises a flow splitter housing having the shape of a modified Y the stem of which housing joins and is operative to revolve concentrically with respect to the motor blast tube, said stem branching into two ducts which act so that the ends thereof face each other, and wherein said nozzle joint joining member includes a tube that is integral with said nozzle and is operative to rotate with respect to the ends of said ducts.

6. A thrust vector control system as specified in claim 5 wherein said nozzle assembly further includes a bearing system at the interface of the motor blast tube and said stem of said flow splitter housing, and a bearing system at each interface of said ducts of said flow splitter housing and said tube of said nozzle joint joining member.

7. A thrust vector control system as specified in claim 6 further including an actuation system to provide independent actuation of said stem and said tube.

8. A thrust vector control system as specified in claim 7 wherein said actuation system includes two actuators each having motive means individual thereto, a first actuator to control the rotation of said stem and thereby the orientation of said nozzle assembly, and second actuator to control the deflection of said tube and thereby the magnitude of the thrust vector angle.

9. A thrust vector control system as specified in claim 8 wherein said first actuator includes a ring gear that is integral with said stem and an orientation actuator assembly having an output pinion gear in engagement with said integral ring gear, and wherein said second actuator includes a sector gear on said tube, a floating gear concentric with said stem, a system of gears connecting said sector gear and said floating gear, and a deflection actuator assembly including an equal-bevel differential having a first output pinion gear in meshing engagement with said integral ring gear, and a second output pinion gear in meshing engagement with said floating ring gear.

10. A thrust vector control system as specified in claim 9 wherein said orientation actuator assembly and said deflection actuator assembly each include individually associated gear reducing means and means to provide position feedback electrical signals.

11. A thrust vector control system as specified in claim 10 wherein said motive means for said first actuator includes a hydraulic motor and associated servo-valve connected to provide driving power to said orientation actuator assembly, and said motive means for said second actuator includes a hydraulic motor and associated servo-valve connected to provide driving power to said deflection actuator assembly, and wherein said orientation actuator assembly, said deflection actuator assembly, said hydraulic motors, and said servo-valves are mounted in fixed position to the motor blast tube with no hydraulic or electrical lines crossing the blast tube joint.

* * * * *